(12) United States Patent
Huo et al.

(10) Patent No.: US 9,588,241 B2
(45) Date of Patent: Mar. 7, 2017

(54) FREQUENCY-VARYING FILTERING OF SIMULTANEOUS SOURCE SEISMIC DATA

(75) Inventors: Shoudong Huo, Dhahran (SA); Hai Xu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 972 days.

(21) Appl. No.: 13/468,550

(22) Filed: May 10, 2012

(65) Prior Publication Data

US 2012/0290213 A1    Nov. 15, 2012

Related U.S. Application Data

(60) Provisional application No. 61/485,729, filed on May 13, 2011.

(51) Int. Cl.
| | |
|---|---|
| *G06F 19/00* | (2011.01) |
| *G01V 1/34* | (2006.01) |
| *G01V 1/36* | (2006.01) |
| *G01V 1/00* | (2006.01) |

(52) U.S. Cl.
CPC ................................. *G01V 1/005* (2013.01)

(58) Field of Classification Search
CPC ........................... G01V 1/005; G01V 2210/74
USPC ..................................................... 702/16, 17
See application file for complete search history.

(56) References Cited

U.S. PATENT DOCUMENTS

| | | | |
|---|---|---|---|
| 4,534,019 A * | 8/1985 | Wiggins et al. | ................. 367/75 |
| 4,953,139 A * | 8/1990 | Laster et al. | ..................... 367/73 |
| 5,067,112 A * | 11/1991 | Meek et al. | ..................... 367/43 |
| 5,721,710 A | 2/1998 | Sallas | |
| 5,924,049 A | 7/1999 | Beasley et al. | |
| 6,327,537 B1 * | 12/2001 | Ikelle | ............................... 702/14 |
| 6,545,944 B2 * | 4/2003 | de Kok | ........................... 367/56 |
| 6,614,717 B1 | 9/2003 | Khan | |
| 6,906,981 B2 | 6/2005 | Vaage | |
| 2009/0010103 A1 | 1/2009 | Sallas et al. | |
| 2009/0323470 A1 * | 12/2009 | Ferris | ............................... 367/24 |
| 2009/0323472 A1 | 12/2009 | Howe | |
| 2010/0080081 A1 | 4/2010 | Morgan et al. | |
| 2010/0299070 A1 | 11/2010 | Abma | |

FOREIGN PATENT DOCUMENTS

| | | |
|---|---|---|
| EP | 2184618 | 5/2010 |
| GB | 1112651 | 5/1968 |
| GB | 2387226 | 8/2003 |

OTHER PUBLICATIONS

Liu et al., "Nonlinear structure-enhancing filtering using plane-wave prediction", Oct. 30, 2009, Geophysical Prospecting.*

(Continued)

*Primary Examiner* — John Breene
*Assistant Examiner* — Yaritza H Perez Bermudez
(74) *Attorney, Agent, or Firm* — Bracewell LLP; Constance G. Rhebergen; Albert B. Kimball, Jr.

(57) ABSTRACT

Seismic data acquired by independent simultaneous sweeping (ISS®) techniques are processed is to attenuate random uncompressed cross-talk signals and improve the resolution of the pre-stack migrated time image. A frequency-varying mean filter is applied on cross-spread offset-azimuth gathers of the data. The frequency-space domain filter may vary its window size according to the characteristics of the cross-talk.

12 Claims, 13 Drawing Sheets

(56) References Cited

OTHER PUBLICATIONS

Lin et al., "Varying-Window-Length Time-Frequency Peak Filtering and Its Application To Seismic Data", 2008, IEEE, International Conference on Computational Intelligence and Security.*

Akerberg, P., G. Hampson, J. Rickett, H. Martin, and J. Cole, 2008, Simultaneous source separation by sparse radon transform: 78th Annual International Meeting, SEG, Expanded Abstracts, 2801-2805.

Bagani, C., 2006, Overview of simultaneous Vibroseis acquisition methods: 76th Annual International Meeting, SEG, Expanded Abstracts, 70-74.

Beasley, C. J., Chamber, R.E., and Jiang, Z., 1998, A new look at simultaneous sources: 68th Annual International Meeting, SEG, Expanded Abstract, 133-135.

Berkhout, A. J., Blacquiere, G. and Verchuur, D.J., 2008, From simultaneous shooting to blended acquisition: 78th Annual International Meeting, SEG, Expanded Abstracts, 2831-2838.

Berkhout, A. J., 2008, Changing the mindset in seismic data acquisition. The Leading Edge, 27, No. 7, 924-938.

Hampson, G., Stefani, J.G., and Herkenhoff, E.F., 2008, Acquisition using simultaneous sources: The Leading Edge, 27, 918-923.

Huo, S., Luo, Y. and Kelamis, P.G., 2009, Simultaneous sources separation via multi-directional vector-median filter. 79th Annual International Meeting, SEG, Expanded Abstracts, 31-35.

Howe, D., Foster, M., Allen, T., Taylor, B. and Jack, I., 2008, Independent simultaneous sweeping—a method to increase the productivity of land seismic crews. 78th Annual International Meeting, SEG, Expanded Abstracts, 2826-2830.

Howe, D., Foster, M., Allen, T., Taylor, B., Jack, l., Buddery, D., Choi, A., Abma, R., Manning, T., and Pfister, M. , 2009, Independent simultaneous sweeping—full scale implementation and new developments. 79th Annual International Meeting, SEG, Expanded Abstracts, 109-111.

Moore, I., Dragoset, B., Ommundsend, T., Wilson, D., Ward, C., and Eke, D., 2008, Simultaneous source separation using dithered sources: 78th Annual International Meeting, SEG, Expanded Abstracts, 2806-2810.

Pecholcs, P.I., Lafon, S.K., Al-Ghamdi, T., Al-Shammery, H., Kelamis, P.G., Huo, S., Winter, O., Kerboul, J.B. and Klein, T., 2010, Over 40,000 vibrator points per day with real-time quality control: opportunities and challenges. 80th Annual International Meeting, SEG, Expanded Abstracts, 111-115.

Spitz, S., Hampson, G., and A. Pica, 2008, Simultaneous source separation: a prediction-subtraction approach: 78th Annual International Meeting, SEG, Expanded Abstracts, 2811-2815.

Bagani, C., 2006, Enhancing the low-frequency content of Vibroseis data. 75th Annual International Meeting, SEG, Expanded Abstracts, 75-79.

Bouska, J., 2009, Distance separated simultaneous sweeping: Efficient 3D Vibroseis acquisition in Oman: 79th Annual International Meeting, SEG, Expanded Abstracts, 1-5.

Matheny, P., Sambell, R., Mahrooqi, S. Yarubi, S. and Abri, S., 2009, Evolution of the land seismic super crew: 79th Annual International Meeting, SEG, Expanded Abstracts, 81-85.

Ongkiehong, L. and Askin, H.J. 1988, Towards the universal seismic acquisition technique: First Break, 06, No.02, 46-63.

Rozemond, J.H., 1996, Slip-sweep acquisition: 66th Annual International Meeting, SEG, Expanded Abstracts, 64-67.

Vermeer, G.J.O., 2002, 3D seismic survey design: Soc. Expl. Geophys., (2002) Chapter 3, pp. 11-26, Chapter 4, pp. 43-46; pp. 62-65.

Huo, S., Tsingas, C., Kelamis, P.G., Xu, H., and Pecholcs, P., 2011, Deblending the Simultaneous Source Blended Data, SPE/DGS Saudi Arabia Section Technical Symposium and Exhibition , May 15-18, 2011.

PCT/US12/37290 Search Report and Written Opinion mailed Oct. 15, 2012.

PCT/US12/37277 Search Report and Written Opinion mailed Oct. 2, 2012.

Co-pending U.S. Appl. No. 13/468,627, filed May 10, 2012.

\* cited by examiner

FREQUENCY-VARYING FILTERING OF SIMULTANEOUS SOURCE SEISMIC DATA

CROSS REFERENCE TO RELATED APPLICATIONS

This application claims priority from U.S. Provisional Application No. 61/485,729, filed May 13, 2011. For purposes of United States patent practice, this application incorporates the contents of the Provisional Application by reference in entirety.

The present invention relates to processing of seismic data obtained in surveys with multiple swept frequency vibratory sources, as does commonly owned U.S. patent application Ser. No. 13/468,627, filed of even date herewith and titled, "COUPLED TIME-DISTANCE DEPENDENT SWEPT FREQUENCY SOURCE ACQUISITION DESIGN AND DATA DE-NOISING" of which applicants are named as inventors.

BACKGROUND OF THE INVENTION

1. Field of the Invention

The present invention relates to processing of seismic data obtained in surveys where multiple swept frequency vibratory sources are operating simultaneously in various sectors of an area of interest.

2. Description of the Related Art

Simultaneous sources or blended acquisition in seismic surveying can significantly improve the source productivity of seismic land and marine crews. Their purpose is to lead to well sampled seismic wavefields and improved seismic imaging. Recently, several field studies on source blended acquisition using vibratory sources have been conducted. The first land simultaneous source acquisition method proposed that each vibroseis fleet operate independently of one another using a stakeless guidance system. The method was referred to as an independent simultaneous sweeping field acquisition technique. The intent was to achieve a significant increase in acquisition efficiency coupled with superior image quality. One available service according to the independent simultaneous sweep method is that provided under the trademark ISS® of BP p.l.c. of the U. K.

Blended acquisition schemes are based on the randomization of source timings such that the cross-talk noise can be attenuated in different domains (i.e., common-receiver, common-offset and cross-spread) using random noise attenuation algorithms and workflows. Stacking and migrating the blended seismic data without any further noise removal or denoising produces acceptable results as stacking can effectively suppress random energy.

Statics is a major concern for simultaneous sources data as clear first-breaks are needed for the calculation. Static correction is a bulk shift of a seismic trace in time during seismic processing. A common static correction is the weathering correction, which compensates for a layer of low seismic velocity material near the surface of the earth. Other corrections compensate for differences in topography and differences in the elevations of sources and receivers. The solution of near surface statics requires accurate first break picking in the recorded trace data.

SUMMARY OF THE INVENTION

Briefly, the present invention provides a new and improved computer implemented method of frequency-varying filtering seismic data resulting from simultaneous emissions at multiple swept frequency vibratory seismic energy sources to reception at seismic energy receivers for a subsurface area of interest. Seismic data received at the receivers are assembled in a computer into common offset data gathers, and the common offset data gathers are transformed in the computer into the frequency-space domain. A median trace amplitude is determined for selected frequency slices of interest for the gathers in the frequency-space domain, and the amplitudes in individual ones of the traces in the selected frequency slices of interest for the gathers in the frequency-space domain are normalized based on the determined median trace amplitude. A variable-frequency mean filter is applied to the traces of the selected frequency slices of interest, and the data from variable-frequency mean filtered traces of the selected frequency slices of interest is then stored.

The present invention also provides a new and improved data processing system for frequency-varying filtering seismic data resulting from simultaneous emissions at multiple swept frequency vibratory seismic energy sources to reception at seismic energy receivers for a subsurface area of interest. The data processing system includes a data storage memory, a processor which assembles the seismic data received at the receivers into common offset data gathers. The processor also transforms the common offset data gathers in the computer into the frequency-space domain and determines a median trace amplitude for selected frequency slices of interest for the gathers in the frequency-space domain. The processor the normalizes the amplitudes in individual ones of the traces in the selected frequency slices of interest for the gathers in the frequency-space domain based on the determined median trace amplitude, and applies a variable-frequency mean filter to the traces of the selected frequency slices of interest, and stores in the data storage memory the data from variable-frequency mean filtered traces of the selected frequency slices of interest.

The present invention also provides a new and improved data storage device having stored in a computer readable medium computer operable instructions for causing a data processing system to apply frequency-varying filtering to seismic data resulting from simultaneous emissions at multiple swept frequency vibratory seismic energy sources to reception at seismic energy receivers for a subsurface area of interest. The instructions stored in the data storage device causing the data processing system to assemble seismic data received at the receivers into common offset data gathers and transform the assembled common offset data gathers into the frequency-space domain. The instructions stored in the data storage device also include instructions causing the processor to determine a median trace amplitude for selected frequency slices of interest for the gathers in the frequency-space domain, and normalize the amplitudes in individual ones of the traces in the selected frequency slices of interest for the gathers in the frequency-space domain based on the determined median trace amplitude. The instructions stored in the data storage device also include instructions causing the processor to apply a variable-frequency mean filter to the traces of the selected frequency slices of interest and store the data from variable-frequency mean filtered traces of the selected frequency slices of interest.

DETAILED DESCRIPTION OF THE PREFERRED EMBODIMENTS

Figure 1A:
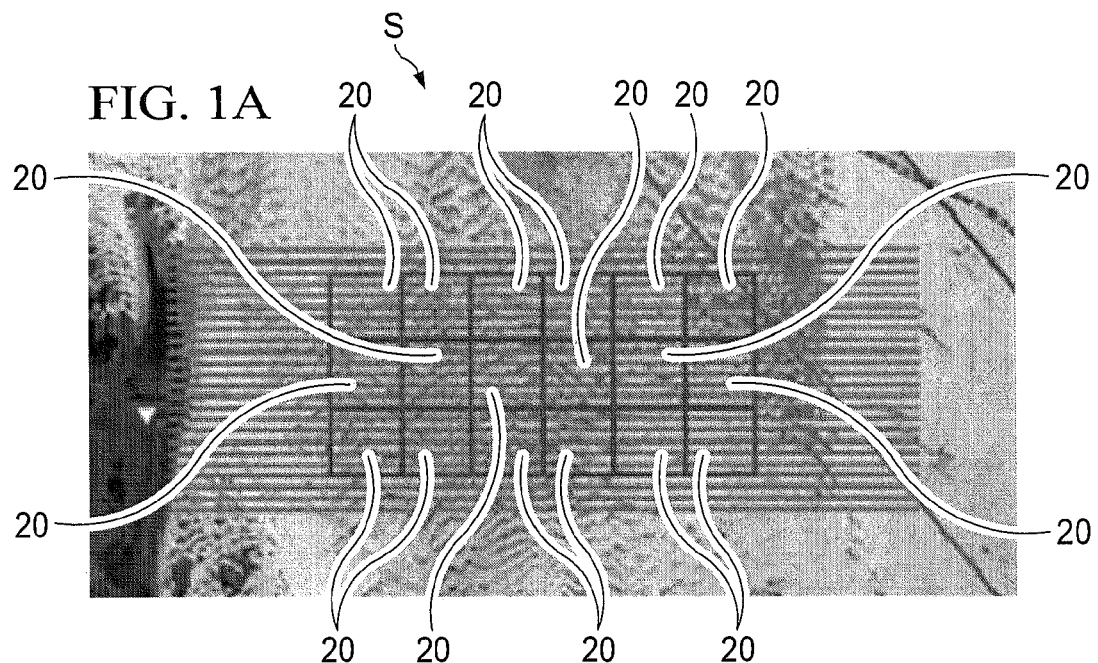
FIG. 1A is a schematic diagram of the arrangement of sectors of an area of the earth's surface for a vibroseis survey field acquisition test.
Figure 1B:
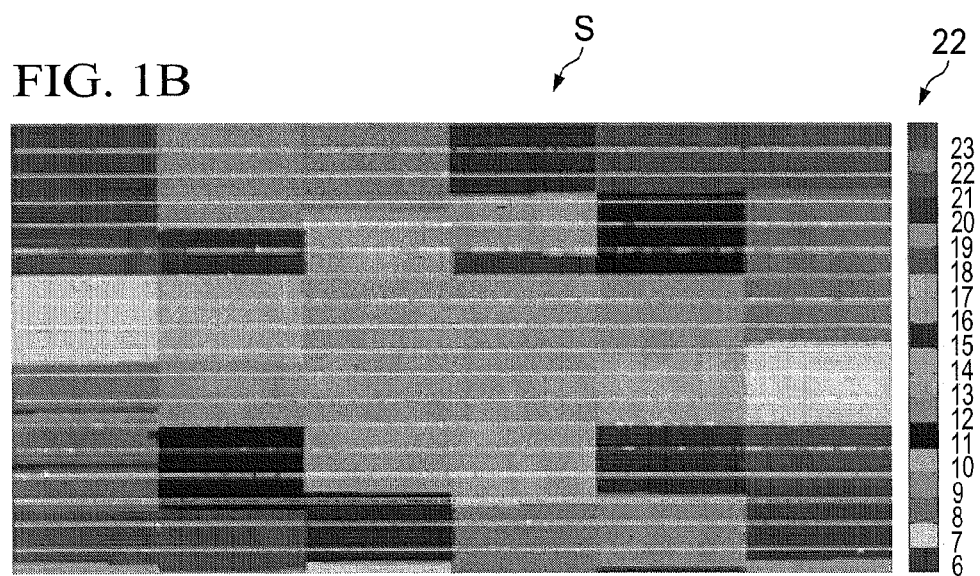
FIG. 1B is a diagram of the allocation of frequency sweep lengths for the vibratory energy sources in the various sectors of FIG. 1A.

By way of illustration, an example series of simultaneous sources field acquisition tests were conducted by employing fixed continuous recording receiver super-spreads. As illustrated in FIG. 1A, a total of eighteen vibrators were constrained to operate in isolation mode in an arrangement of 3×6 sectors as indicated by reference numeral 20, where each sector 20 was 1.8 km×1.8 km in surface extent with 4,320 VPs on a 25 m×25 m source grid interval and with a conventional fixed super-spread of receivers. Data was acquired with eighteen unique linear upsweeps, ranging from time duration from 6 to 23 seconds. To optimize the field test time, the sweep lengths were changed in each sector as shown in FIG. 1B. In FIG. 1B, the sweep length time assigned to each sector in the spread S is identified by an indicative key 22. These uncorrelated records of the responses of subsurface formations to the seismic energy imparted by the vibrators were continuously recorded in time, then parsed and correlated.

A first concern about the source blended data is whether it can be processed by the conventional processing workflow due to the severe crosstalk. In order to minimize the effects of crosstalk, the simultaneous sources design has the following characteristics: high source density, unique up-sweep length and spatial separation. The 25 m×25 m source grid results in a tremendous high source density and much higher fold than reference production data (2196 versus 336). Cross-correlating adjacent linear upsweep, with only a one-second difference in sweep rate, reduced the cross-talk by 20 dB or more. The spatial separation (1.8 km×1.8 km) is also essential as it attempts to protect the first-break data from contamination by crosstalk. Moreover, all the characteristics help to realize the randomness of sources which is the key to the success of the simultaneous sources technique.

Figure 2A:
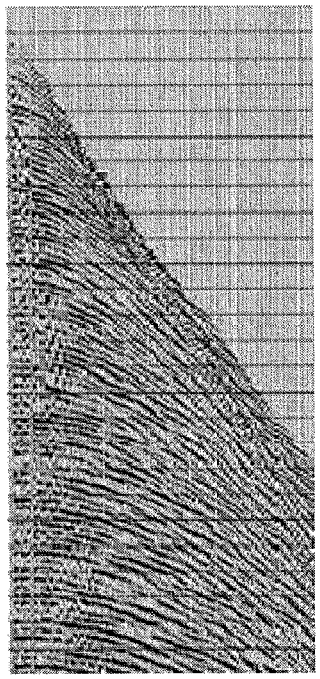
FIG. 2A is a plot of a sample common depth point (CDP) gather of reference production data.
Figure 2B:
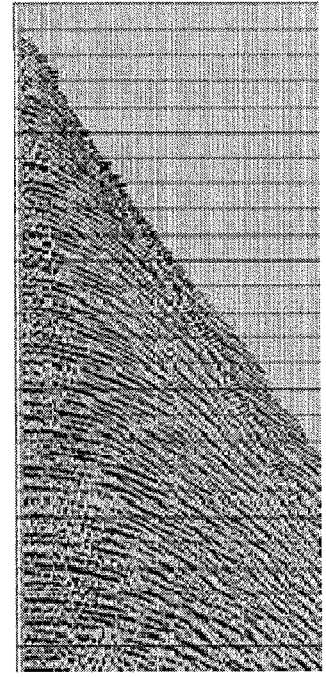
FIG. 2B is a plot of a sample common depth point (CDP) gather of a vibroseis survey of the same sector as FIG. 2A.
Figure 2C:
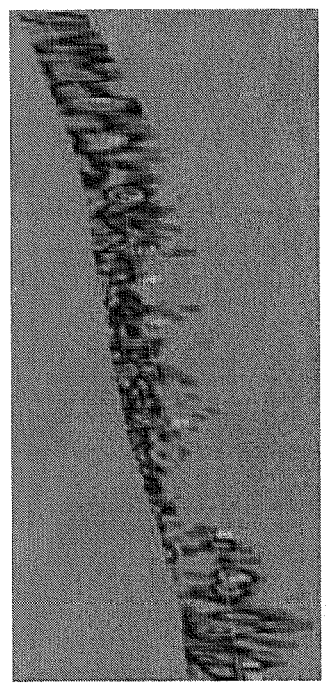
FIG. 2C is a plot of velocity semblance of the production data of FIG. 2A.
Figure 2D:
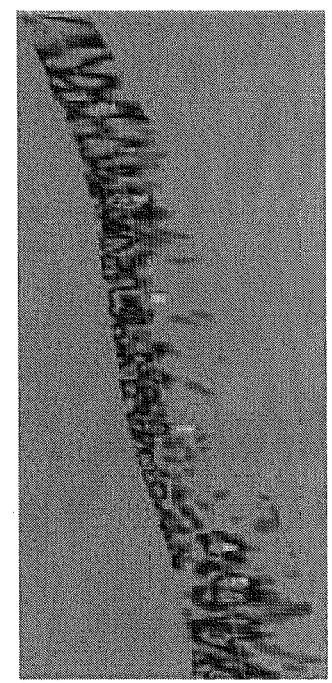
FIG. 2D is a plot of velocity semblance of the production data of FIG. 2B.

FIGS. 2A through 2D illustrate examples of velocity analysis of simultaneous source data. FIG. 2A is a sample common depth point (CDP) gathers of reference production data with a fold of 336, and FIG. 2B is a sample CDP gather of simultaneous source data with a fold of 2196. With the high fold and good randomness, the simultaneous sources data well eliminates the crosstalk effects. The velocity semblances of both data (FIGS. 2C and 2D for FIGS. 2A and 2B, respectively) are almost identical, which indicates that the velocity analysis is hardly affected by crosstalk.

Statics, as has been noted, is a major concern for simultaneous sources data, as clear first-breaks are needed for the calculation. Processing tests of data from the survey indicates that even without any deblending effort, available first-break auto-picking modules can produce satisfactory results.

Figure 3:
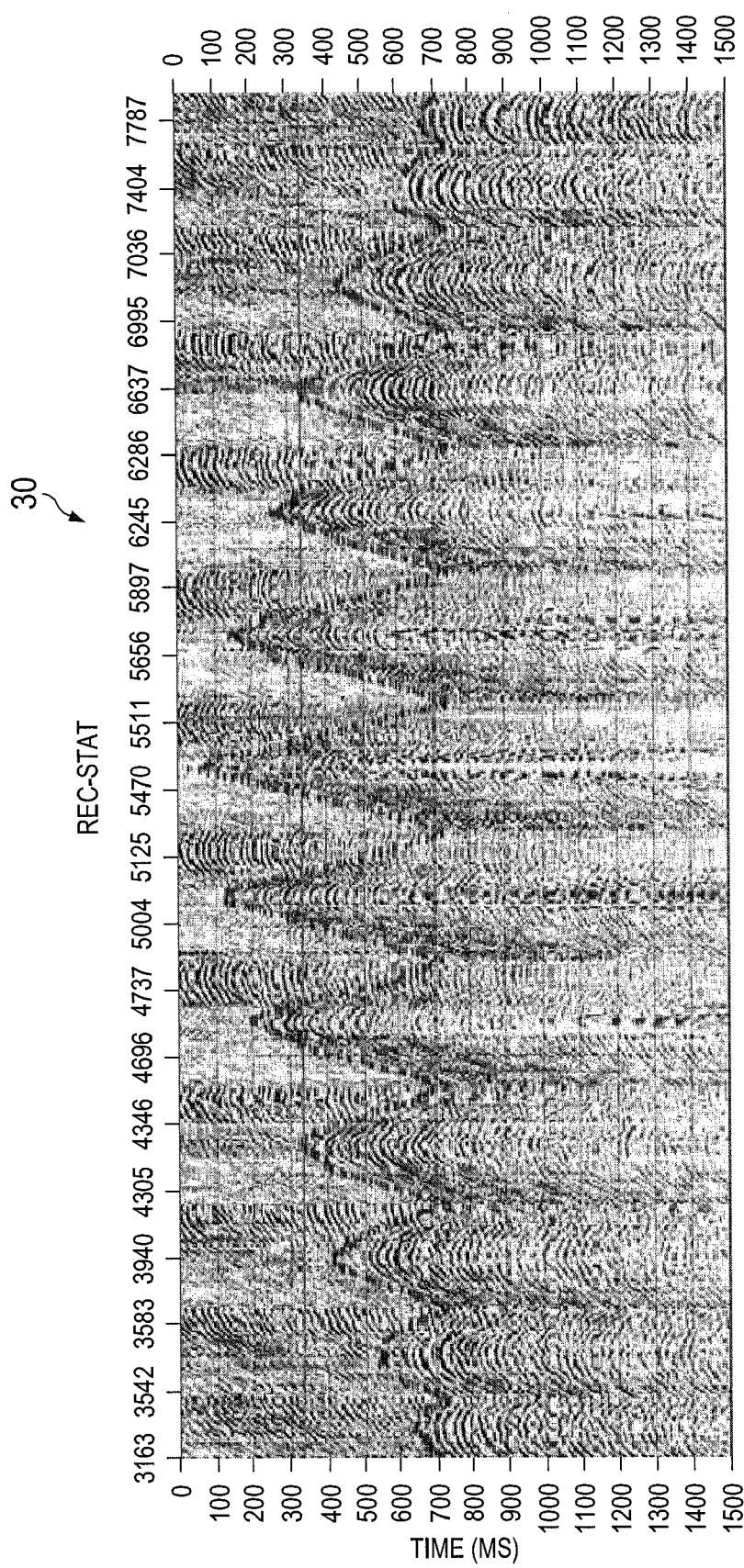
FIG. 3 is a plot of first-break auto picking results on a sample survey gather.

FIG. 3 shows sample simultaneous sources shot gather 30 with severe crosstalk. The dots plotted as indicated at 32 across the upper half of the sample gather 30 in FIG. 3 indicate the picked first-breaks on the sample gather. Because of the randomness of crosstalk and the unique upsweep length, residual statics can also be safely applied on the simultaneous sources data.

Although the conventional processing on simultaneous sources data are fairly satisfactory, cross-talk attenuation or de-blending processing has been developed with the present invention to produce clean gathers which further improve the processing results. Due to the nature of simultaneous sources acquisition, the crosstalk is severe but appears random in some geometry domains such as CDP, common receiver and cross-spread offset gathers. With the present invention, it has been found that such cross-talk can be attenuated by random noise attenuation processing in the cross-spread common-azimuth gather domain.

Figure 4A:
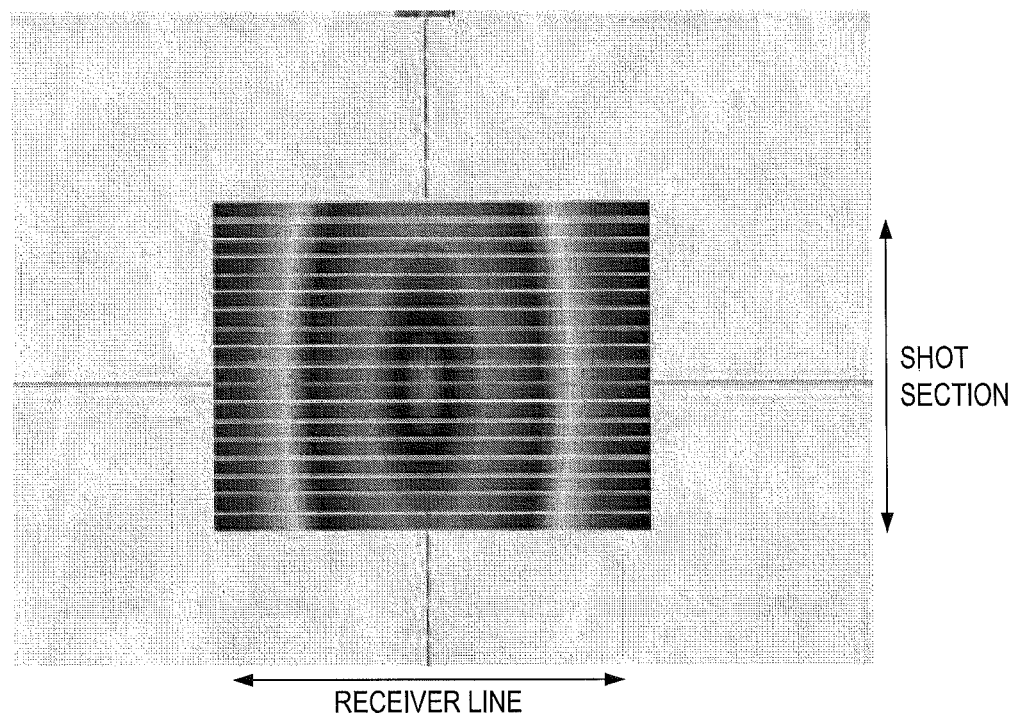
FIG. 4A is a map of a sample cross-spread gather with offset variations indicated.
Figure 5A:
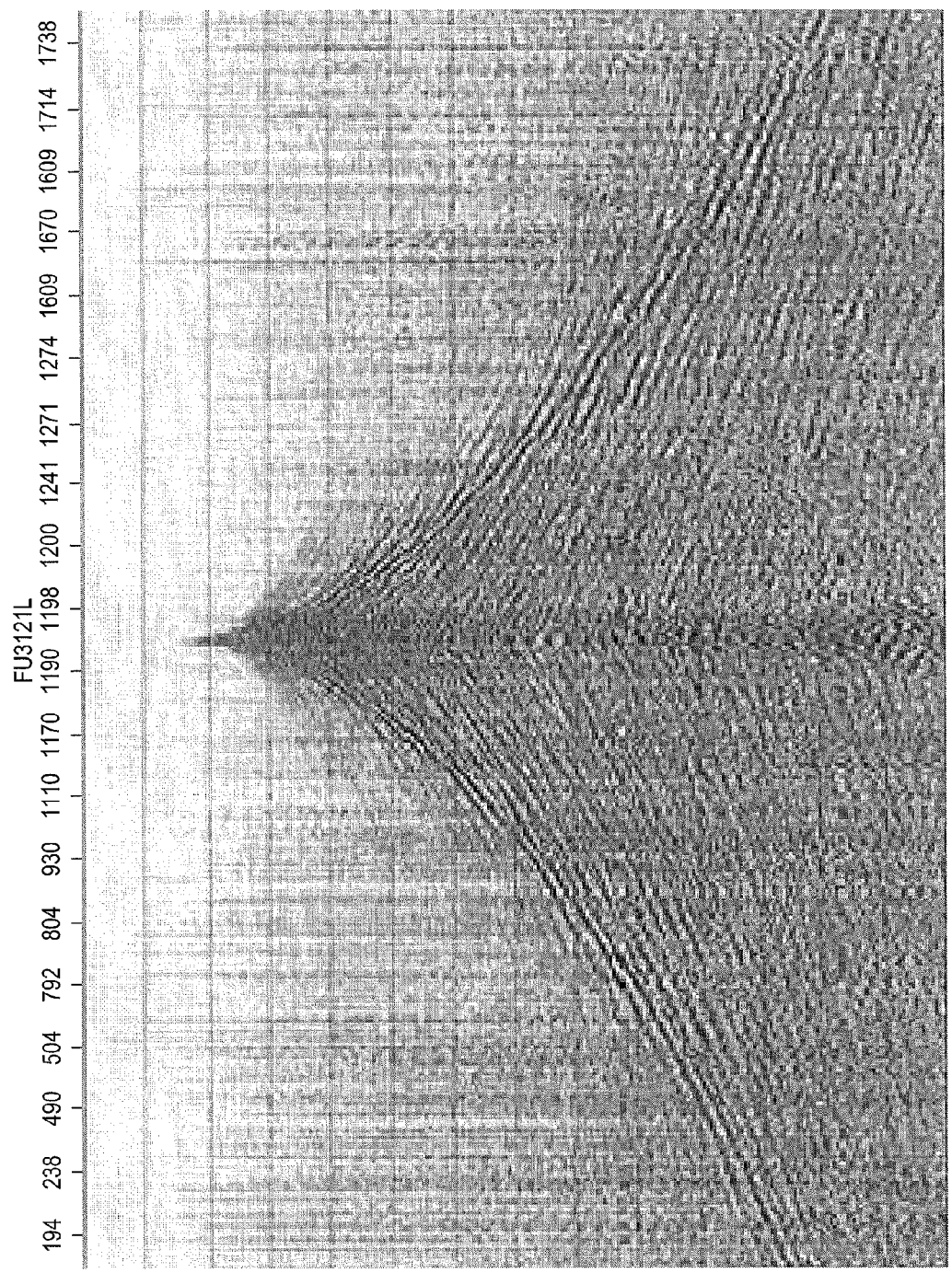
FIG. 5A is a plot of a sample gather of cross-spread offset.

According to the present invention, cross-spread azimuth-offset gathers are formed from simultaneous sources data. One cross-spread gather is a suite or collection of all the traces generated by one shot station and one receiver line. FIG. 4A shows a sample cross-spread gather which gather indicating variations of offset values. In FIG. 4A the horizontal line or axis of the plot is the receiver line, and the vertical line or axis is the shot station. If a cross-spread gather is sorted by offset, the signals will appear coherent while crosstalk will appear random (FIG. 5A). However, crosstalk attenuation results in cross-spread offset gathers are not satisfactory, and the main problem is signal smearing. This is due to two reasons. First, cross-spread offset gather is not consistent in geology as the neighboring traces may come from around 20 km away depending on the offset range as can be seen in FIG. 5A. Secondly, the gathers do not consider surface consistency such as the shot (or source) and receiver amplitude anomalies.

Figure 4B:
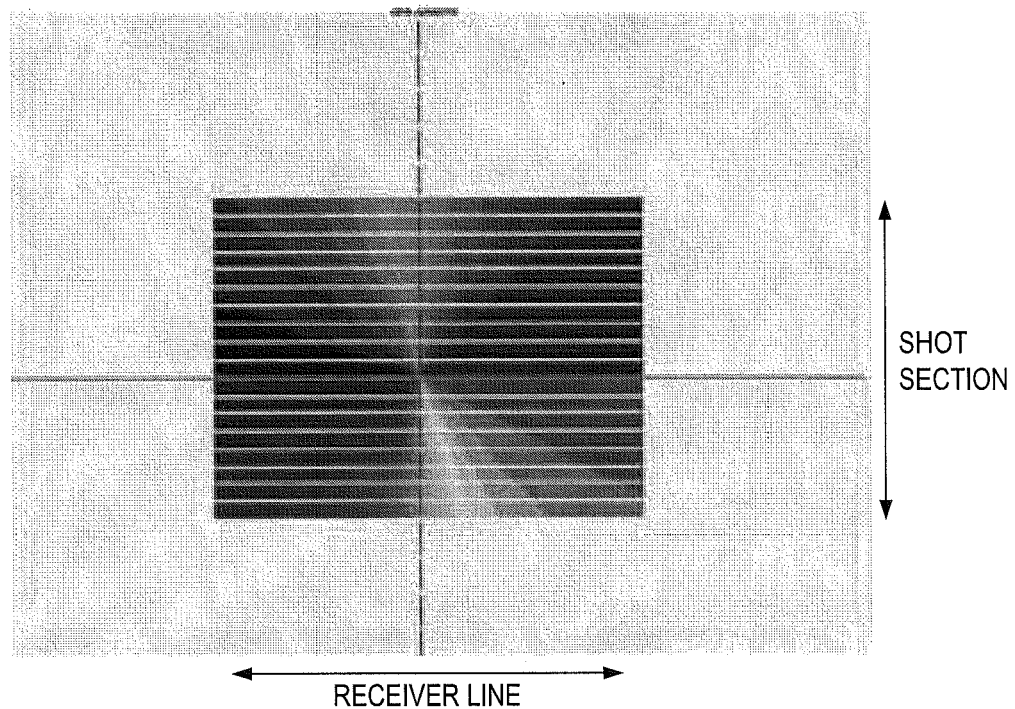
FIG. 4B is a map of a sample cross-spread gather with azimuth variations indicated.
Figure 5B:
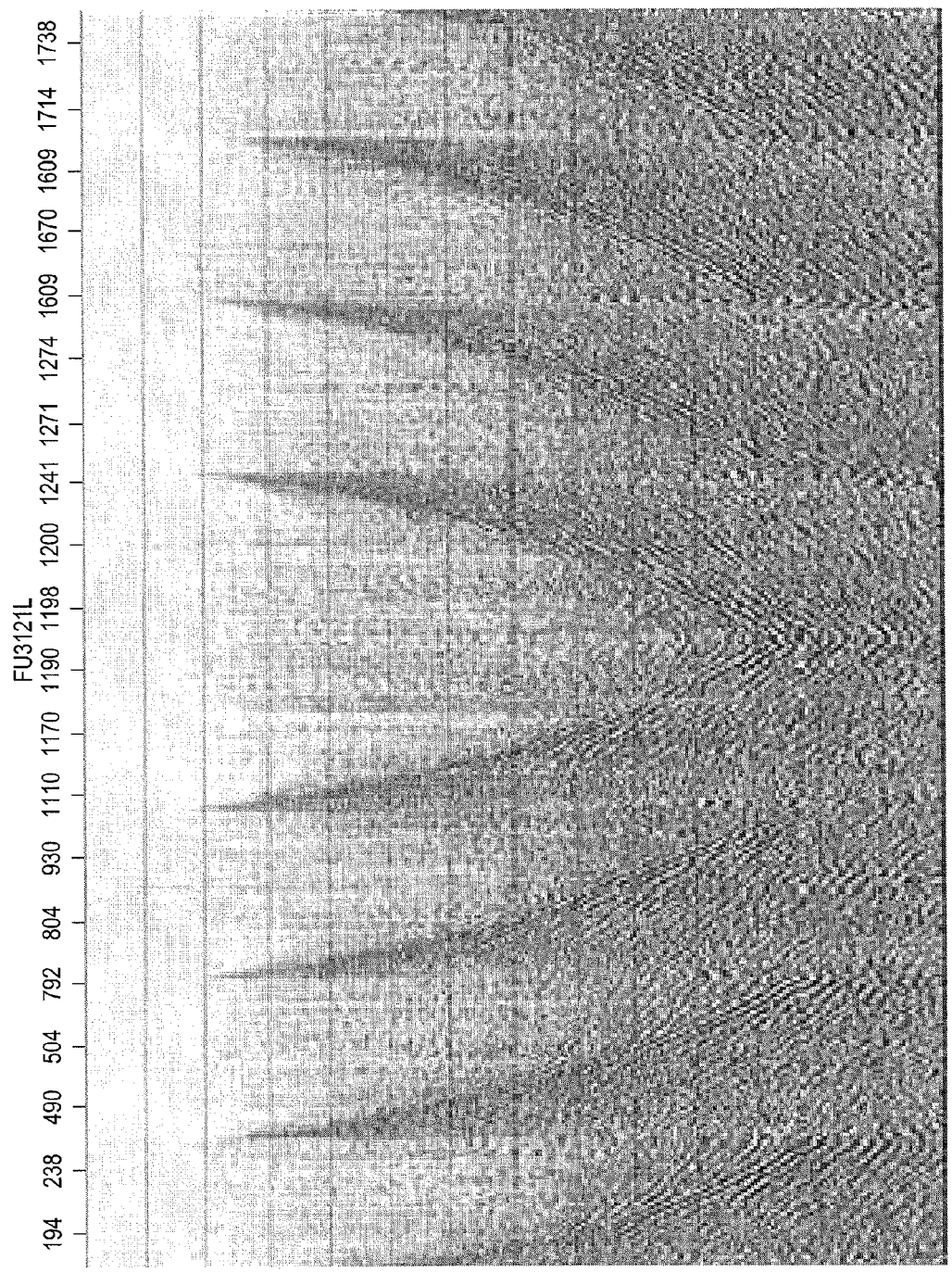
FIG. 5B is a plot of a sample gather of cross-spread azimuth-offset.

In a cross-spread map, each radius is a common azimuth gather as can be observed in FIG. 4B. As was the case with FIG. 4A, in FIG. 4B the horizontal line or axis of the plot is the receiver line, and the vertical line or axis is the shot station. Neighboring azimuth gathers have similar geology and surface consistency. In order to take this advantage of this, the cross-spread gathers are grouped with the present invention, by azimuth to form a cross-spread azimuth-offset (XSPR-AO) gather. In an XSPR-AO gather, it has been found that the crosstalk appears random and both geology and surface consistency have been considered. FIG. 5B shows a sample XPSR-AO gather grouped by 45 degrees azimuth.

With the data gathered in a cross-spread azimuth-offset gather domain, a new technique according to the present invention is provided for effective crosstalk attenuation. A mean filter in frequency-space (FX) domain is often a good method in removing random noises. However, it has the risks of smearing signals when neighboring traces are not similar. Observing that lower frequency signals are less sensitive in smearing, an improved technique, a varying-frequency mean filter, is applied with the present invention. In this processing, the filter length of the applied filter varies for each frequency to achieve the best attenuation result while avoiding signal smearing (Equation 1), as follows:

$$M_f = \frac{\sum_{i=1}^{N_f} F_i W_i}{\sum_{i=1}^{N_f} W_i} \quad (1)$$

where $M_f$ is the mean filter result of frequency f, and $N_f$ is the filter length, $F_i$ is the complex value of each involved trace at frequency f, $W_i$ is the corresponding weight values. The key point of the filter is that $N_f$ can be variable according to the characteristics of the cross-talk to be attenuated.

For instance, a user may choose the linearly decreasing filter length (Equation 2) for low-frequency cross-talk attenuation, as follows:

$$N_f = L - af \quad (2)$$

where L and a define the linearly varying filter length. In this case, the filter mainly targets the low frequency while barely touches the high frequencies so as to prevent signal smearing. It is well suited for the processing of simultaneous sources data and can be further improved by applying linear move-out and statics correction beforehand in order to obtain the velocity and statics before cross-talk attenuation or deblending.

Figure 6:
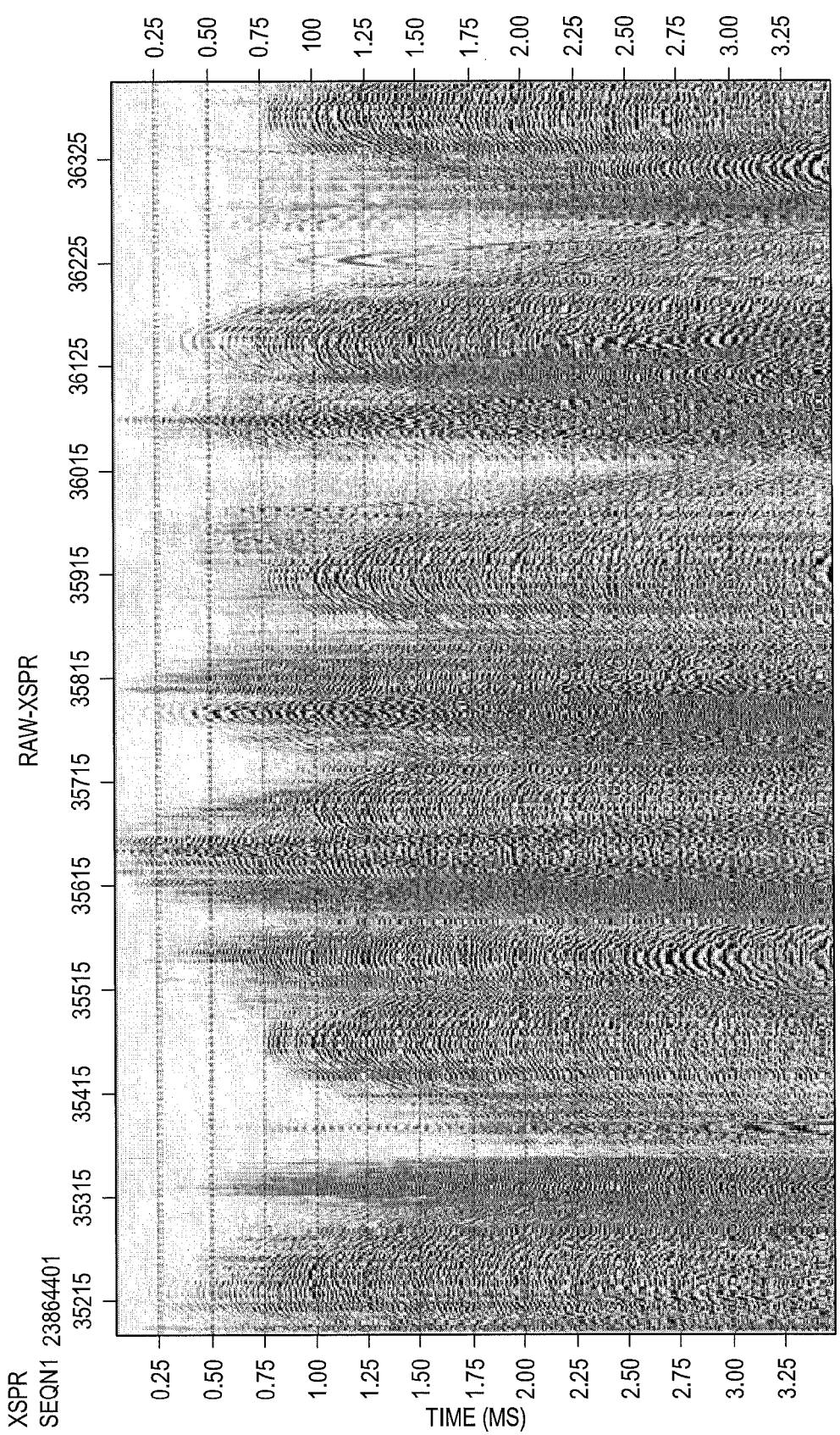
FIG. 6 is a plot of sample shot gathers of an example vibroseis survey test.

Crosstalk happens when there are other sources firing during listening time. For simultaneous sources acquisition technology, the crosstalk is severe due to the elimination of listening time, as shown below in FIG. 6. It is a big obstacle for conventional data processing especially pre-stack data analysis such as amplitude variation with offset, or AVO.

The present invention cleanly removes the cross-talk while preserving the signals by Frequency-varying Mean Filter in cross-spread azimuth-offset gathers. According to the present invention, the data is processed in cross-spread azimuth-offset gathers, while conventional approaches, so far as is known, use common receiver gather, common CDP gathers or cross-spread common offset gather. The present further utilizes a cascaded application of frequency-varying median and mean filters which can tackle cross-talk according to their spectrum characteristics. Conventionally, median and mean filters have been applied in the time domain and thus have caused unavoidable signal smearing. The present invention significantly removes the cross-talk while preserving the signals by the cascaded application of frequency-varying median and mean filters in the cross-spread azimuth-offset domain gathers.

Figure 7A:
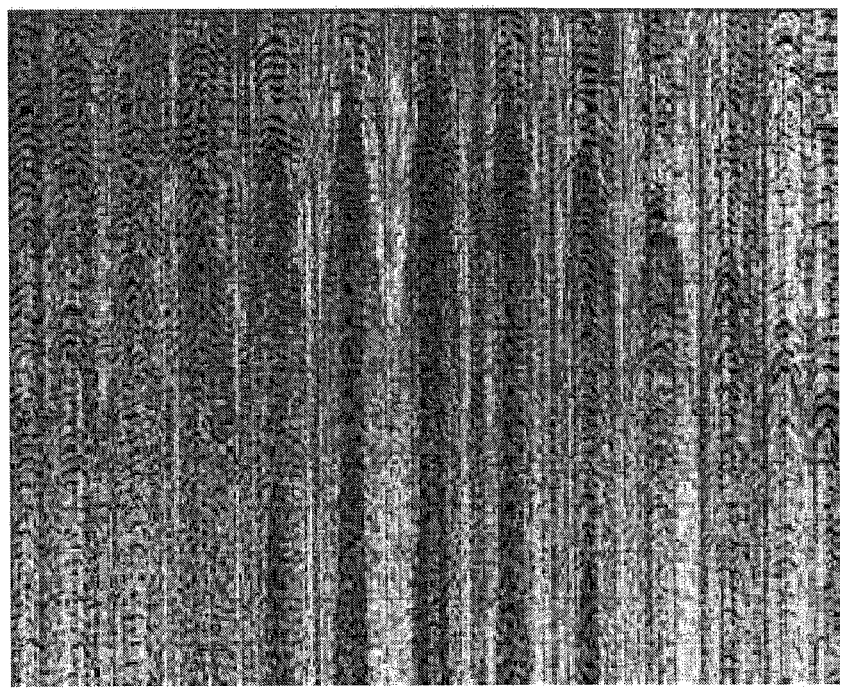
FIG. 7A is a plot of source records for a group of cables without deblending.
Figure 7B:
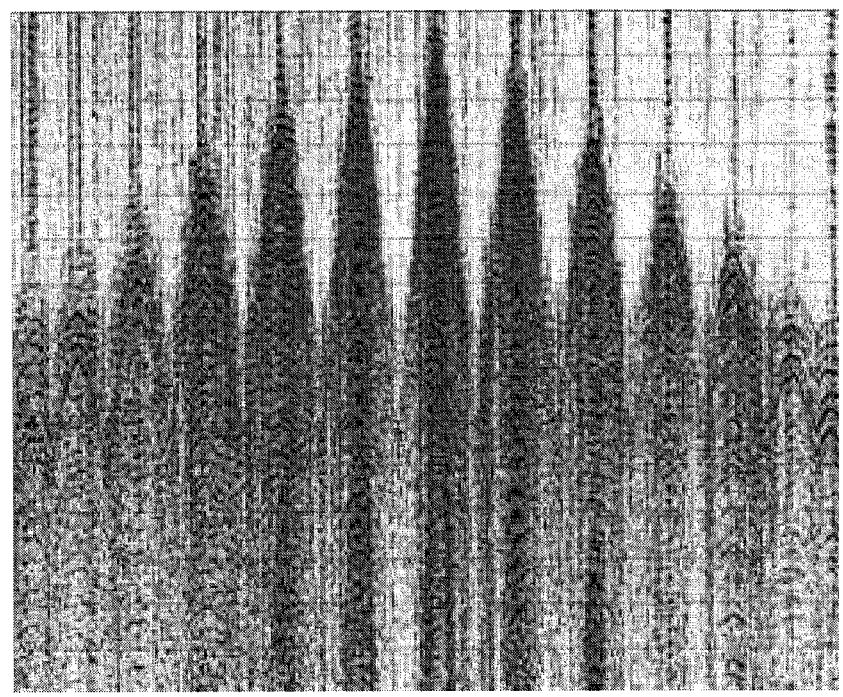
FIG. 7B is a plot of source records for a group of cables with deblending and with corresponding first break pick times.

The solution of near surface statics requires accurate first break picking. The effect of source blended acquisition on picking first breaks is illustrated below. Tests have proved that even without any deblending effort, auto-picking modules are capable of estimating the first break picks with little dispersion (FIG. 2). The picking of first breaks was then further improved by applying a deblending methodology with the present invention. FIG. 7A is a plot of source records for twelve cables with no cross-talk attenuation, while FIG. 7B is a plot of the same data after processing to attenuate cross-talk in, or deblend, the data. A significant decrease in pick time dispersion is evident in the data plots of FIG. 7B when compared to the data of FIG. 7A.

Figure 8A:
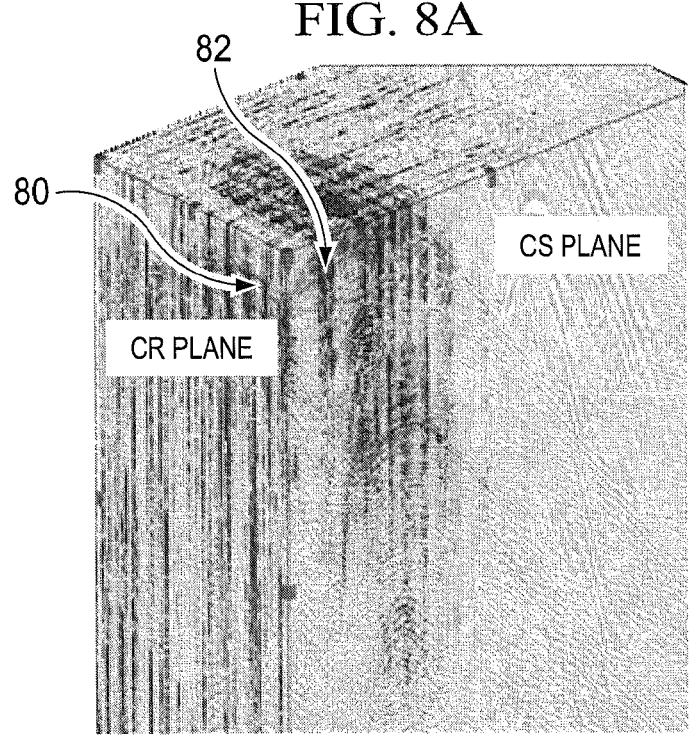
FIGS. 8A and 8C are plots of a sample cross-spread gather displayed in a 3D mode for common reference plane and common receiver plane.
Figure 8B:
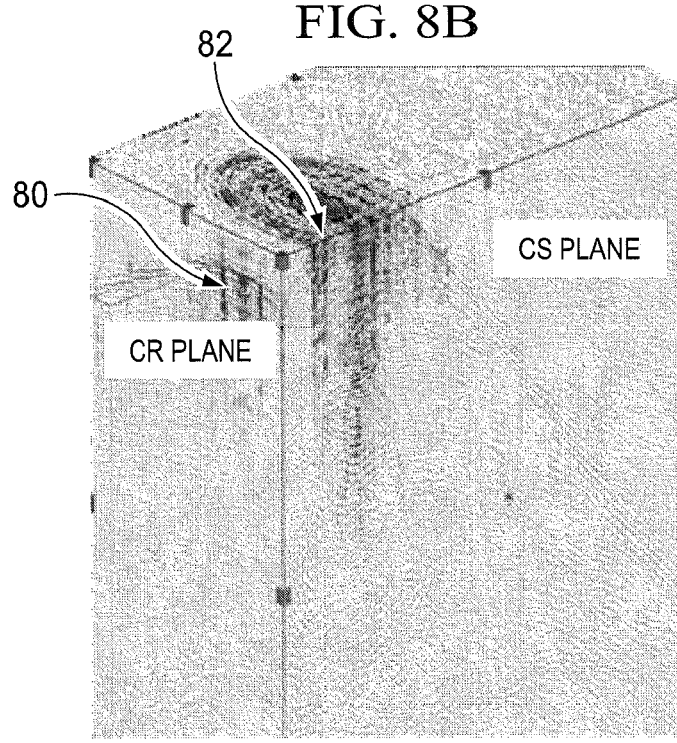
FIGS. 8B and 8D are plots of the sample cross-spread gathers of FIGS. 8A and 8C, respectively, after deblending.
Figure 8C:
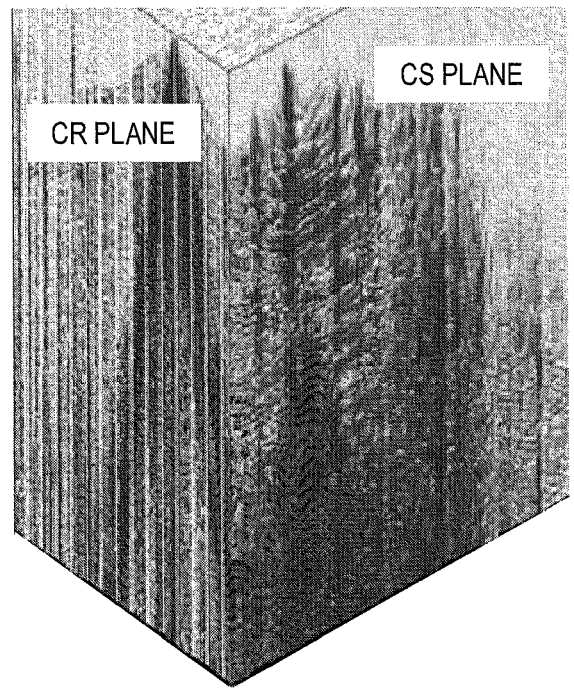
Figure 8D:
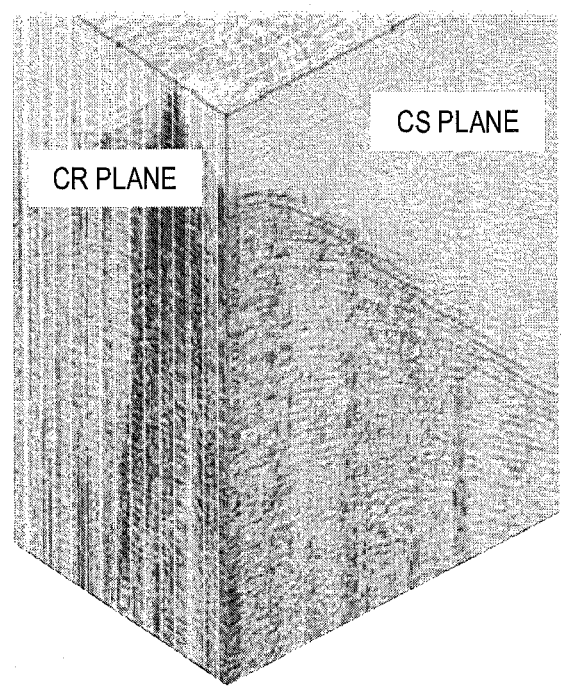

FIGS. 8A through 8D show the deblending results on a sample cross-spread gather displayed in 3D mode. In FIGS. 8A and 8C, one can observe strong coherent crosstalk in the shot domain (right or CS plane) and random cross-talk in the receiver domain (left or CR plane). The red arrows 80 and 82 in FIGS. 8A and 8B point to the surface consistent amplitude anomalies of the type mentioned previously. FIGS. 8C and 8D depict the same cross-spreads with the cross-talk well attenuated after deblending while the amplitude anomalies are well preserved.

Figure 9C:
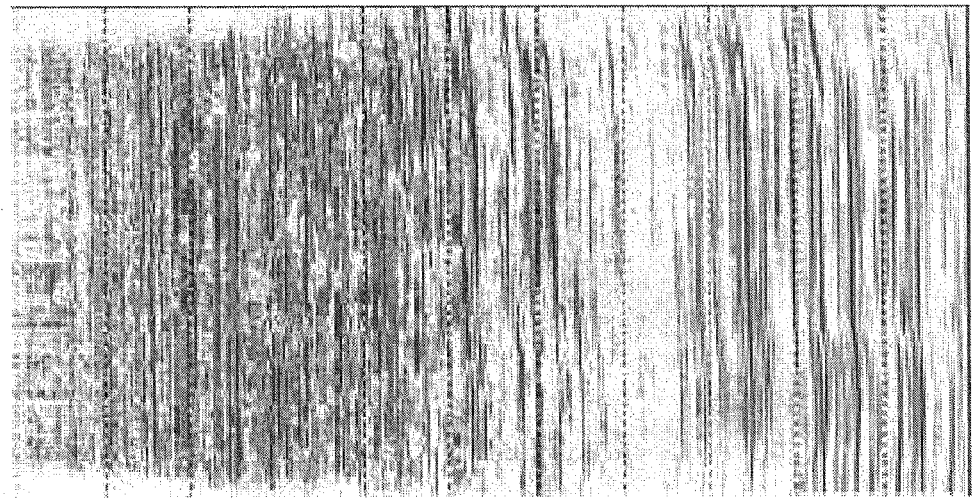
FIG. 9C is a plot of pre-stack time migration (PSTM) results of simultaneous sweeping survey of the same sector as FIG. 9B, with deblending.
Figure 9B:
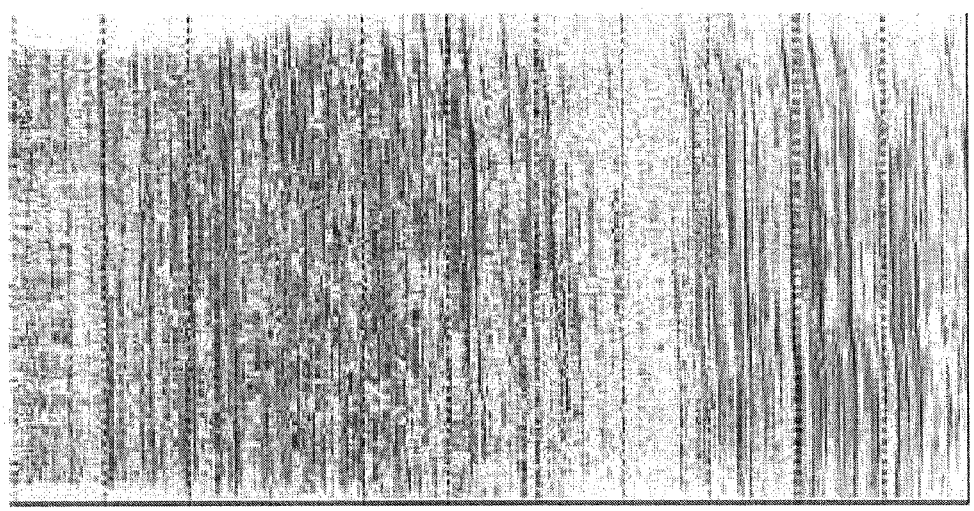
FIG. 9B is a plot of pre-stack time migration (PSTM) results of simultaneous sweeping survey of the same sector as FIG. 9A, without deblending.
Figure 9A:
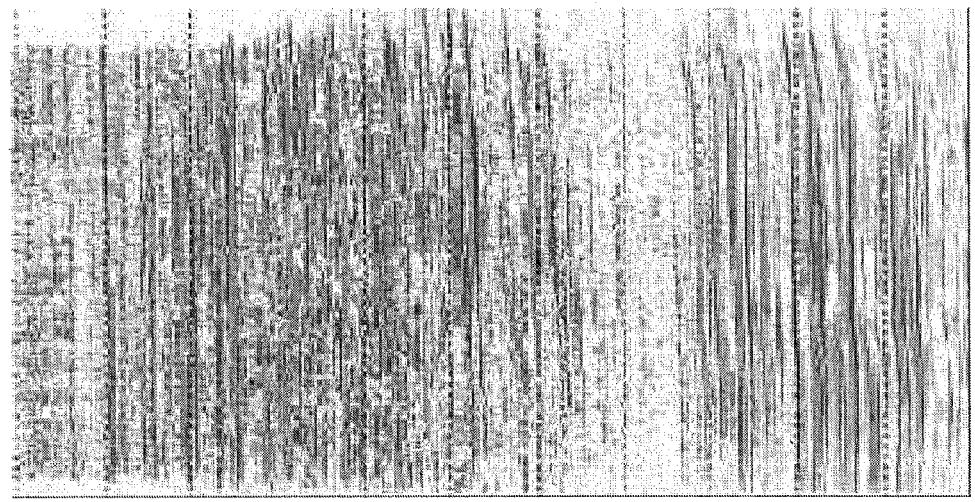
FIG. 9A is a plot of pre-stack time migration (PSTM) results of reference production data.

FIG. 9A through 9C show a comparison of pre-stack time migration (PSTM) results on the reference and simultaneous source data. FIG. 9A is a display of PSTM results on reference data, and FIG. 9B is a display of PSTM data resulting from surveying without processing according to the present invention. FIG. 9C is a display of the data plotted in FIG. 9B, but after the cascaded application of frequency-varying median and mean filters in the cross-spread azimuth-offset domain gathers according to the present invention.

Figure 10A:
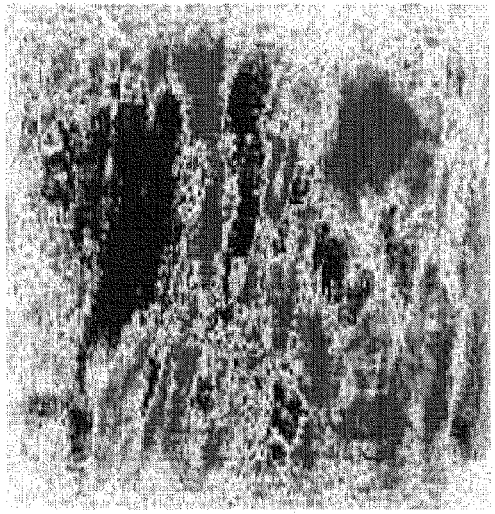
FIG. 10A is a plot of a plot of pre-stack time migration (PSTM) comparison time slice of reference production data.
Figure 10B:
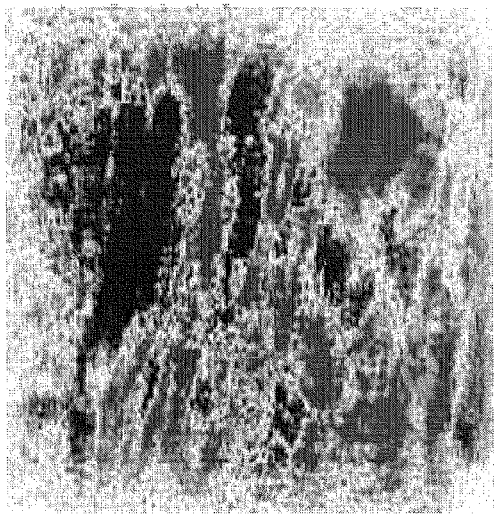
FIG. 10B is a plot of a plot of pre-stack time migration (PSTM) comparison time of survey data without deblending.
Figure 10C:
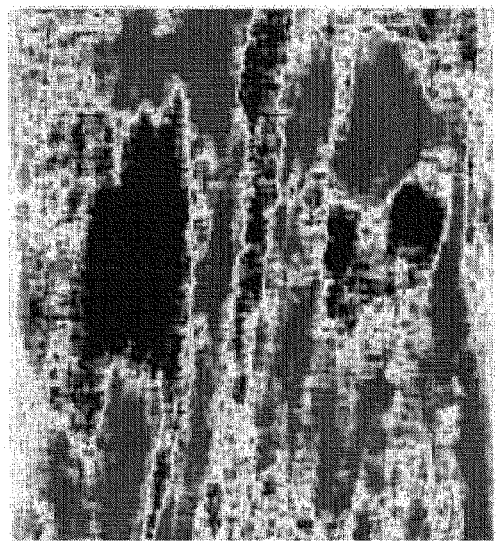
FIG. 10C is a plot of a plot of pre-stack time migration (PSTM) comparison time of survey data with deblending.

FIGS. 10A through 10C are a similar comparison of PSTM time slices. FIG. 10A is a display of a PSTM time slice from reference data, and FIG. 10B is a display of a PSTM slice from data resulting from surveying without processing according to the present invention. FIG. 10C is a display of the data plotted in FIG. 10B, but after the cascaded application of frequency-varying median and mean filters in the cross-spread azimuth-offset domain gathers according to the present invention.

One can observe from both of the foregoing sets (FIGS. 9A through 9C and FIGS. 10A through 10C) that although processing results of source blended data without deblending application might be satisfactory, the application of the cascaded application of frequency-varying median and mean filters in the cross-spread azimuth-offset domain gathers according to the present invention are further improved.

Improvements are noticeable in the final image quality, and superior results are produced compared with the reference production data set.

A flow chart F (FIG. 11) composed of a set of seismic data processing steps illustrates the structure of the logic of the present invention as embodied in computer program software. The flow chart F is a high-level logic flowchart which illustrates a method according to the present invention of processing seismic trace data to attenuate random uncompressed cross-talk signals. Those skilled in the art appreciate that the flow charts illustrate the structures of computer program code elements that function according to the present invention. The invention is practiced in its essential embodiment by computer components that use the program code instructions in a form that instructs a digital data processing system D (FIG. 12) to perform a sequence of processing steps corresponding to those shown in the flow chart F.

Figure 11:
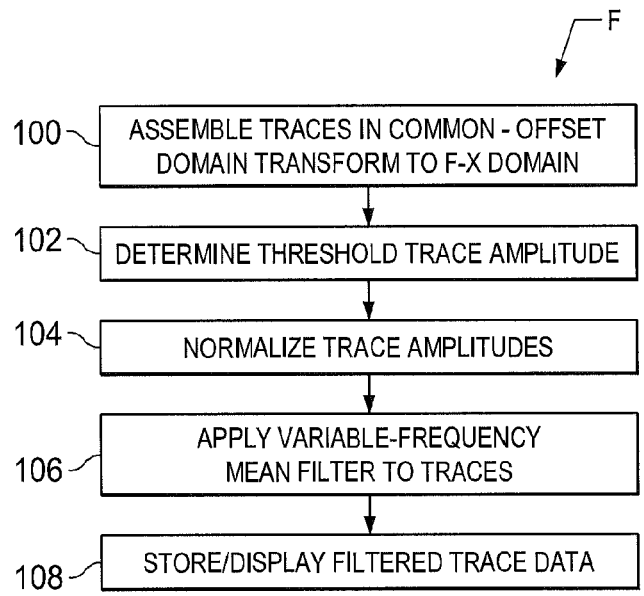
FIG. 11 is functional block diagram of a set of data processing steps performed in the computer system of FIG. 12 during the processing methodology according to the present invention.

The flow chart F of FIG. 11 contains a preferred sequence of steps of a computer implemented method or processes for attenuation of cross-talk by trace data processing the cross-spread common-azimuth gather domain. The flow chart F is a high-level logic flowchart illustrates a method according to the present invention. The method of the present invention performed in the computer 120 (FIG. 12) of the data processing system D can be implemented utilizing the computer program steps of FIG. 11 stored in memory 124 and executable by system processor 122 of computer 120. The input data to processing system D are independent simultaneous sweeping seismic survey data of the obtained in the manner set forth above from an area of interest. As will be set forth, the flow chart F illustrates a preferred embodiment of a computer implemented method or process for frequency-varying filtering of simultaneous source seismic data.

During step 100 (FIG. 11) of the flow chart F, the seismic traces from an survey of the type described above are assembled in a common-offset gather and transformed into the frequency-space (FX) domain. During step 102, for each frequency slice of interest from the survey data transformed into the frequency-space domain during step 100, a median or threshold trace amplitude is determined.

During step 104, each of the amplitudes in individual ones of the traces of each frequency slice of interest are then normalized, based on the threshold value determined during step 102. During step 106, a variable-frequency mean filter, with filter characteristics according to frequency, filter length, weighting values and linear varying frequency relations discussed above, is applied to the traces of each of the frequency slices of interest. During step 108, the filtered data from step 106 are stored and available for presentation as output images or displays for interpretation and analysis.

Figure 12:
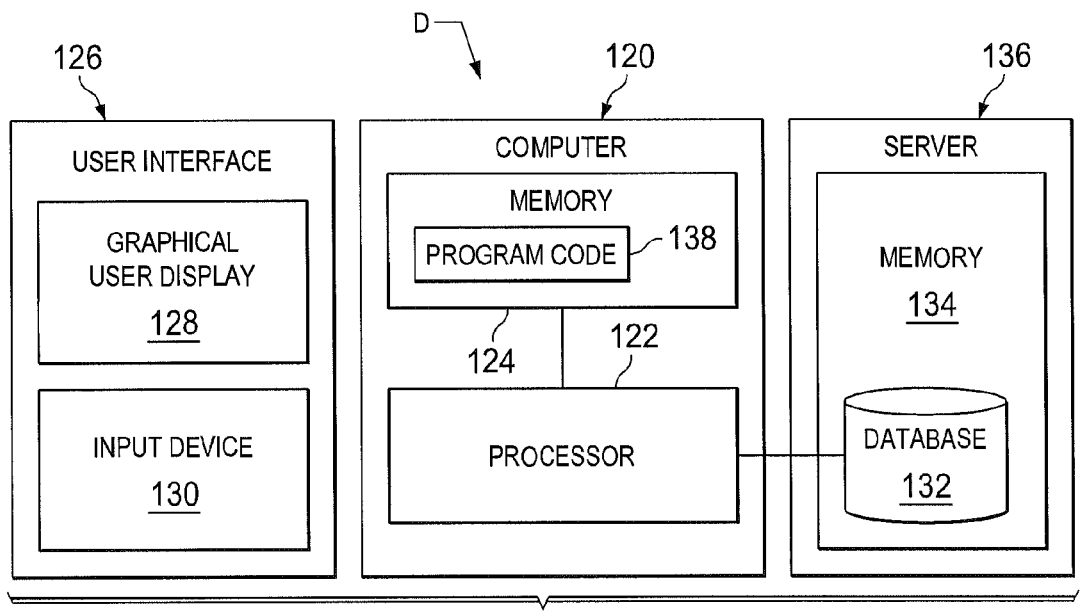
FIG. 12 is a schematic diagram of a computer system for attenuation of cross-talk by trace data processing the cross-spread common-azimuth gather domain according to the present invention.

As illustrated in FIG. 12, a data processing system D according to the present invention includes the computer 120 having processor 122 and memory 124 coupled to the processor 122 to store operating instructions, control information and database records therein. The computer 120 may, if desired, be a portable digital processor, such as a personal computer in the form of a laptop computer, notebook computer or other suitable programmed or programmable digital data processing apparatus, such as a desktop computer. It should also be understood that the computer 120 may be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

The computer 120 has a user interface 126 and an output display 128 for displaying output data or records of processing of seismic data survey measurements performed according to the present invention for attenuation of cross-talk by trace data processing the cross-spread common-azimuth gather domain. The output display 128 includes components such as a printer and an output display screen capable of providing printed output information or visible displays in the form of graphs, data sheets, graphical images, data plots and the like as output records or images.

The user interface 126 of computer 120 also includes a suitable user input device or input/output control unit 130 to provide a user access to control or access information and database records and operate the computer 120. Data processing system D further includes a database 132 stored in computer memory, which may be internal memory 124, or an external, networked, or non-networked memory as indicated at 134 in an associated database server 136.

The data processing system D includes program code 138 stored in memory 124 of the computer 120. The program code 138, according to the present invention is in the form of computer operable instructions causing the data processor 12 to attenuate cross-talk by trace data processing in the cross-spread common-azimuth gather domain according to the processing steps illustrated in FIG. 11.

It should be noted that program code 138 may be in the form of microcode, programs, routines, or symbolic computer operable languages that provide a specific set of ordered operations that control the functioning of the data processing system D and direct its operation. The instructions of program code 138 may be may be stored in memory 124 of the computer 120, or on computer diskette, magnetic tape, conventional hard disk drive, electronic read-only memory, optical storage device, or other appropriate data storage device having a computer usable medium stored thereon. Program code 138 may also be contained on a data storage device such as server 136 as a computer readable medium, as shown.

From the foregoing, it can be seen that the present invention cleanly removes cross-talk in multiple swept frequency vibratory source field acquired data while preserving the information content of the signals by frequency-varying Mean Filter in cross-spread azimuth-offset gathers. According to the present invention, the data is processed in cross-spread azimuth-offset gathers, while conventional approaches, so far as is known, use common receiver gather, common CDP gathers or cross-spread common offset gather. The present further utilizes a cascaded application of frequency-varying median and mean filters to the data in the cross-spread azimuth-offset domain, where the filters can attenuate cross-talk according to their spectrum characteristics. Conventionally, median and mean filters have been applied in the time domain and thus have caused unavoidable signal smearing. The present invention significantly removes the cross-talk while preserving the signals by the cascaded application of frequency-varying median and mean filters in the cross-spread azimuth-offset domain gathers.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention.

What is claimed is:

1. A method of seismic surveying and attenuating crosstalk in seismic traces resulting from the seismic survey, comprising the steps of:
   locating a plurality of swept frequency vibratory seismic energy sources in a seismic spread over a subsurface area of interest;
   the sources being located at assigned separate sectors in the seismic spread;
   locating a plurality of seismic energy receivers in assigned separate sectors over the subsurface area of interest;
   simultaneously emitting seismic energy at the plurality of swept frequency vibratory seismic energy sources;
   the seismic energy sources operating at different frequency sweeps of different time length while emitting the seismic energy to travel through the earth;
   the simultaneously emitted seismic energy traveling through the earth for reception by the plurality of seismic energy receivers;
   concurrently receiving the seismic energy from the simultaneous emissions as time-variant seismic traces at the plurality of seismic energy receivers after travel of the seismic energy through the earth;
   assembling in a computer the time-variant seismic traces received at the receivers into common offset gathers in a time-distance domain;
   transforming the common offset gathers in the time-distance domain with the computer into a frequency-space domain;
   forming cross-spread azimuth-offset gathers of the assembled common offset gathers in the frequency-space domain;
   determining median trace amplitude for selected frequency slices of interest for the cross-spread azimuth-offset gathers in the frequency-space domain;
   normalizing the amplitudes in individual ones of the traces in the selected frequency slices of interest for the cross-spread azimuth-offset gathers in the frequency-space domain based on the determined median trace amplitude;
   applying a variable-frequency mean filter to each of the traces of the selected frequency slices of interest to form attenuated crosstalk seismic traces;
   storing the attenuated crosstalk traces from the variable-frequency mean filtered traces of the selected frequency slices of interest; and
   forming an output record of the attenuated crosstalk traces from the variable-frequency mean filtered traces of the selected frequency slices of interest.

2. The method of claim 1, wherein the determined median traces amplitude defines an amplitude threshold.

3. The method of claim 2, wherein the step of normalizing comprises the step of:
   normalizing the amplitudes of the individual ones of the traces in the selected frequency slices of interest based on the defined amplitude threshold.

4. The method of claim 2, wherein the step of applying a variable-frequency mean filter comprises the step of:
   applying a varying length filter according to the selected frequency slices of interest.

5. The method of claim 2, wherein the step of applying a variable-frequency mean filter comprises the step of:
   applying a filter of linearly decreasing length according to the selected frequency slices of interest.

6. The method of claim 2, wherein the step of applying a variable-frequency mean filter comprises the step of:
   applying different weighted values in the filter to different frequencies in the selected frequency slices of interest.

7. A seismic survey trace acquisition system with frequency-varying filtering to attenuate crosstalk in seismic traces resulting from the seismic survey, comprising:
   a plurality of swept frequency vibratory seismic energy sources located in a seismic spread over a subsurface area of interest;
   the sources being located at assigned separate sectors in the seismic spread;
   a plurality of seismic energy receivers located in assigned separate sectors over the subsurface area of interest;
   the plurality of swept frequency vibratory seismic energy sources simultaneously emitting seismic energy for travel through the earth for reception by the plurality of seismic energy receivers;
   the seismic energy sources operating at different frequency sweeps of different time length while emitting the seismic energy to travel through the earth;
   the seismic energy receivers receiving the emitted seismic energy after travel through the earth;
   a data processing system receiving as inputs the received seismic energy at the plurality of seismic energy receivers and performing frequency-varying filtering to attenuate crosstalk in the seismic traces resulting from the simultaneous emissions of seismic energy by the seismic energy sources, comprising:
      a data storage memory storing the received seismic energy inputs;
      a processor for performing the steps of:
   assembling the seismic energy from the simultaneous emissions, concurrently received at the plurality of seismic energy receivers after travel through the earth, as time-variant seismic traces in common offset gathers in a time-distance domain;
   transforming the common offset gathers in the time-distance domain into a frequency-space domain;
   forming cross-spread azimuth-offset gathers of the assembled common offset gathers in the frequency-space domain;
   determining median trace amplitude for selected frequency slices of interest for the cross-spread azimuth-offset gathers in the frequency-space domain;
   normalizing the amplitudes in individual ones of the traces in the selected frequency slices of interest for the cross-spread azimuth-offset gathers in the frequency-space domain based on the determined median trace amplitude;
   applying a variable-frequency mean filter to each of the traces of the selected frequency slices of interest to form attenuated crosstalk seismic traces;
   storing in the data storage memory the attenuated crosstalk traces formed from the variable-frequency mean filtered traces of the selected frequency slices of interest; and
   an output display forming output records of attenuated crosstalk traces formed from the variable-frequency mean filtered normalized amplitude traces of the selected frequency slices of interest.

8. The seismic survey trace acquisition system of claim 7, wherein the median trace amplitude determined by the processor defines an amplitude threshold.

9. The seismic survey trace acquisition system of claim 8, wherein the processor in performing the step of normalizing performs the step of:
   normalizing the amplitudes of the individual ones of the traces in the selected frequency slices of interest based on the defined amplitude threshold.

10. The seismic survey trace acquisition system of claim 7, wherein the processor in performing the step of applying a variable-frequency mean filter performs the step of:
   applying a varying length filter according to the selected frequency slices of interest.

11. The seismic survey trace acquisition system of claim 7, wherein the processor in performing the step of applying a variable-frequency mean filter performs the step of:
   applying a filter of linearly decreasing length according to the selected frequency slices of interest.

12. The seismic survey trace acquisition system of claim 7, wherein the processor in performing the step of applying a variable-frequency mean filter performs the step of:
   applying different weighted values in the filter to different frequencies in the selected frequency slices of interest.

* * * * *